United States Patent
Shim et al.

(10) Patent No.: US 7,595,598 B2
(45) Date of Patent: Sep. 29, 2009

(54) MAGNETIZING MOTOR AND MAGNETIZING METHOD THEREOF

(75) Inventors: Jang-Ho Shim, Seoul (KR); Sung-Ho Lee, Anyang (KR); Jae-Min Kim, Seoul (KR); Jae-Hak Choi, Seoul (KR); Jin-Soo Park, Incheon (KR)

(73) Assignee: LG Electronics Inc., Seoul (KR)

( * ) Notice: Subject to any disclaimer, the term of this patent is extended or adjusted under 35 U.S.C. 154(b) by 316 days.

(21) Appl. No.: 11/610,753

(22) Filed: Dec. 14, 2006

(65) Prior Publication Data
US 2007/0152611 A1    Jul. 5, 2007

(30) Foreign Application Priority Data
Dec. 30, 2005    (KR) .................. 10-2005-0136044

(51) Int. Cl.
*H02P 7/00*    (2006.01)
(52) U.S. Cl. .............. 318/268; 318/823; 318/817; 318/816; 318/799; 318/727; 318/728; 310/173
(58) Field of Classification Search ......... 318/822, 318/817, 816, 713, 799, 727, 725, 728, 268, 318/823; 310/173
See application file for complete search history.

(56) References Cited

U.S. PATENT DOCUMENTS

| | | | | |
|---|---|---|---|---|
| 3,614,577 A | * | 10/1971 | Honeywell et al. | 318/654 |
| 3,849,682 A | * | 11/1974 | Binns | 310/156.69 |
| 4,190,794 A | * | 2/1980 | Mikulic | 318/831 |
| 4,495,449 A | * | 1/1985 | Black et al. | 318/60 |
| 4,644,206 A | * | 2/1987 | Smith | 310/115 |
| 5,013,990 A | * | 5/1991 | Weber | 318/814 |
| 5,159,255 A | * | 10/1992 | Weber | 318/775 |
| 5,276,392 A | * | 1/1994 | Beckerman | 318/751 |
| 6,831,388 B1 | * | 12/2004 | Leijon et al. | 310/196 |
| 2007/0007842 A1 | | 1/2007 | Shim et al. | |

OTHER PUBLICATIONS

U.S. Appl. No. 11/608,584, to Lee et al., filed on Dec. 8, 2006.

* cited by examiner

*Primary Examiner*—Rita Leykin
(74) *Attorney, Agent, or Firm*—Ked & Associates, LLP (57) ABSTRACT

A magnetizing motor having a permanent magnet body covering an outer circumferential surface of a rotor body, includes a speed detecting unit that detects a speed of the magnetizing motor; and a controlling unit that compares the speed detected by the speed detecting unit with a reference speed, and outputs a magnetizing control signal based on the result of the comparison.

20 Claims, 6 Drawing Sheets

MAGNETIZING MOTOR AND MAGNETIZING METHOD THEREOF

CROSS-REFERENCE TO RELATED APPLICATIONS

The present disclosure relates to subject matter contained in priority Korean Application No. 10-2005-0136044, filed on Dec. 30, 2005, which is herein expressly incorporated by reference in its entirety.

BACKGROUND OF THE INVENTION

1. Field of the Invention

The present invention relates to a magnetizing motor, and more particularly, to a magnetizing motor capable of improving the magnetizing efficiency of a permanent magnet by discontinuously applying an alternating current to a magnetizing coil that magnetizes a permanent magnet for a constant time, and a magnetizing method thereof.

2. Description of the Background Art

Generally, a prior art magnetizing motor is provided with a permanent magnet body at a rotor having a bar conductor, and serves as an induction motor before an rpm of the rotor reaches a synchronous speed of a rotational magnetic field. The magnetizing motor serves as a permanent magnet motor by magnetizing the permanent magnet body so as to reach the synchronous speed of the rotational magnetic field.

Figure 1:
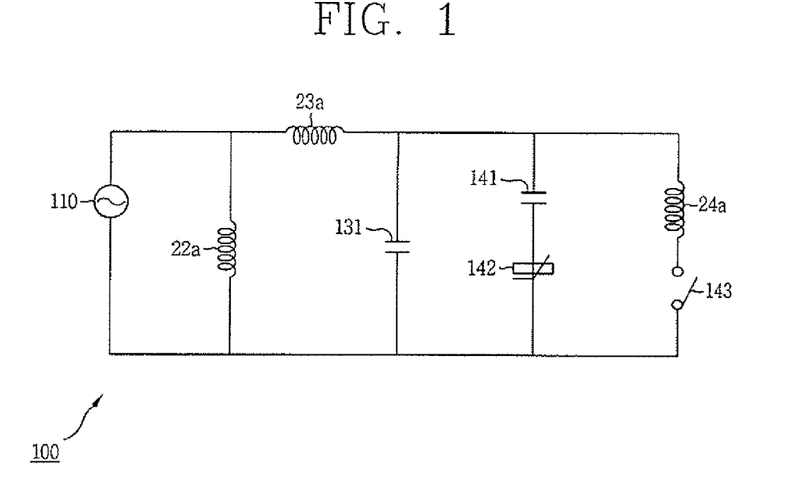
FIG. 1 is a driving circuit diagram showing a magnetizing motor in accordance with the prior art.

FIG. 1 is a circuit diagram showing a magnetizing motor of the prior art.

As shown, a main induction coil 22a, a sub induction coil 23a, and a magnetizing coil 24a are respectively connected to a power supply 110 for supplying an alternating current in parallel. A first capacitor 131 for controlling a phase difference of a current applied to the sub induction coil 23a is connected to the sub induction coil 23a in accordance with a current applied to the main induction coil 22a. A second capacitor 141 for controlling a phase difference of a current applied to the magnetizing coil 24a is connected to the magnetizing coil 24a in accordance with a current applied to the main induction coil 22a.

A PCT sensor for protecting a circuit from a short or fire by having an increased resistance value is connected to the second capacitor 141 in serial.

A switch 143 for switching the circuit is connected to the magnetizing coil 24a in serial.

The operation of the prior art magnetizing motor will be explained.

When a rotor of the magnetizing motor is to be rotated, a current having a high phase difference is applied to the sub induction coil 23a via the first capacitor 131. Accordingly, an induction current is generated at the bar conductor of the rotor by an electromagnetic magnetization. Then, the bar conductor is rotated in a magnetic field generated by the sub induction coil 23a according to Fleming's left hand rule.

Then, a current having a phase difference slower than the current applied to the sub induction coil 23a by 90° is applied to the main induction coil 22a. Accordingly, a magnetic field is generated at a stator, and thus the bar conductor of the rotor is continuously rotated.

However, since the rotor is a rigid magnetic body having a high magnetic permeability, a magnetic field generated by the main induction coil 22a and the sub induction coil 23a magnetizes the body of the rotor. Accordingly, the body of the rotor receives hysteresis torque H by a hysteresis effect, and is thus rotated.

Figure 2:
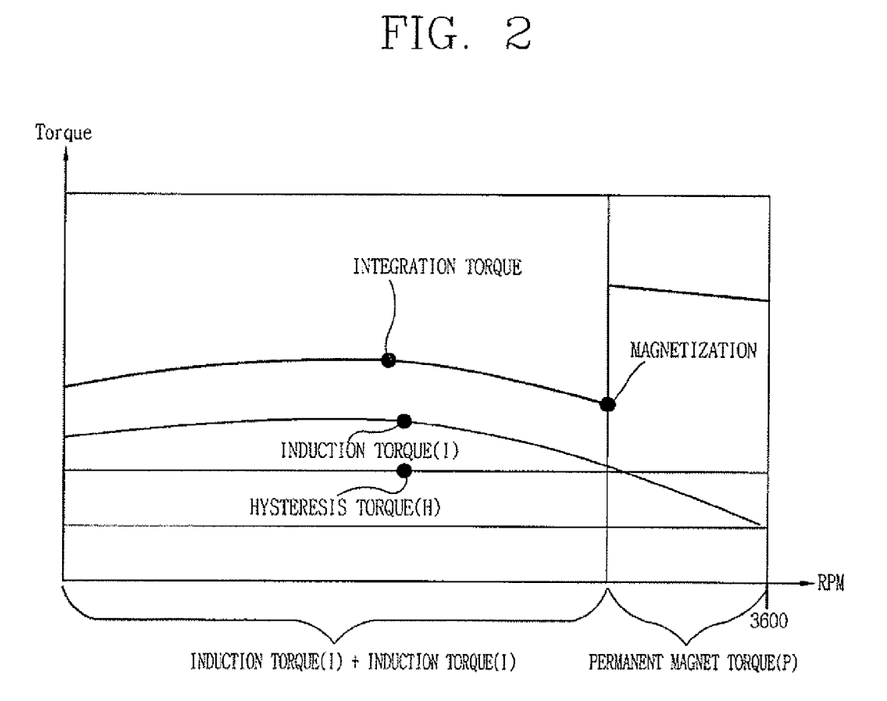
FIG. 2 is a graph showing a function of the magnetizing motor of FIG. 1

As shown in FIG. 2, the body of the rotor and the bar conductor receive a hysteresis torque H and an induction torque I, respectively, thereby being rotated by an integration torque of the hysteresis torque H and the induction torque I.

When an rpm of the body of the rotor and the bar conductor becomes a synchronous speed (3600 rpm) of the rotational magnetic field, the induction torque I of the bar conductor becomes zero. Accordingly, the rotor is rotated with an rpm slower than the synchronous speed of the rotational magnetic field. That is, a slip phenomenon is generated.

When the body of the rotor and the bar conductor have an rpm corresponding to 75%-80% of the synchronous speed, a strong current is applied to the magnetizing coil 24a. Accordingly, a strong flux generated from the magnetizing coil 24a is transmitted to a permanent magnet body covering an outer circumferential surface of the rotor body through an end of a magnetizing pole, thereby magnetizing the permanent magnet body.

Since the magnetizing pole is formed of a rigid magnetic body having a high magnetic permeability and an end thereof is tapered, a strong flux is transmitted to the permanent magnet body of the rotor without a loss thus to magnetize the permanent magnet body.

The permanent magnet body becomes a permanent magnet, and is thus rotated in a rotational magnetic field generated at the stator.

Even when the rpm of the rotor is increased to be equal to the synchronous speed (3,600 rpm) of the rotation magnetic field, the permanent magnet is continuously rotated in the rotational magnetic field. Accordingly, a rotational force of the rotor is not decreased.

The prior art magnetizing motor is rotated by the induction torque I and the hysteresis torque H in a low speed step, and is rotated by a permanent magnet torque P in a high speed step (synchronous speed: 3,600 rpm), accordingly, as the magnetizing pole magnetizes the permanent magnet body.

However, the prior art magnetizing motor has the following problem. That is, as a large current is continuously applied to the magnetizing coil so as to magnetize the permanent magnet body, thermal loss is generated from the magnetizing coil. Accordingly, driving efficiency of the motor is lowered.

SUMMARY OF THE INVENTION

The present invention is provided to address at least the above described problems in the art. Therefore, an object of the present invention is to provide a magnetizing motor capable of improving magnetizing efficiency by reducing thermal loss generated from a magnetizing coil by applying a current to a permanent magnet body for a constant time through a magnetizing coil only when the permanent magnet body is magnetized, and a magnetizing method thereof.

Another object of the present invention is to provide a magnetizing motor capable of improving magnetizing efficiency of a permanent magnet body by preventing a change of an rpm of a rotor by discontinuously applying a current to the permanent magnet body for a constant time through a magnetizing coil only when the permanent magnet body is magnetized, and a magnetizing method thereof.

To achieve these and other advantages and in accordance with the purpose of the present invention, as embodied and broadly described herein, an aspect of the present invention provides a magnetizing motor having a permanent magnet body covering an outer circumferential surface of a rotor body, the magnetizing motor including a speed detecting unit that detects a speed of the magnetizing motor; and a controlling unit that compares the speed detected by the speed detecting unit with a reference speed, and outputs a magnetizing control signal based on the result of the comparison.

According to another aspect of the present invention, there is provided a magnetizing motor having a permanent magnet body covering an outer circumferential surface of a rotor body, the magnetizing motor including a speed detecting unit that detects a speed of the magnetizing motor; a controlling unit that compares the speed detected by the speed detecting unit with a reference speed, and outputs a magnetizing control signal based on the result of the comparison; a switching unit switched by the magnetizing control signal, that conducts a magnetizing current of several cycles for a constant time; and a magnetizing coil that generates flux by the magnetizing current of several cycles and magnetizes the permanent magnet body.

According to another aspect of the present invention, there is provided a magnetizing motor having a permanent magnet body covering an outer circumferential surface of a rotor body, the magnetizing motor including a speed detecting unit that detects a speed of the magnetizing motor; a controlling unit that compares the speed detected by the speed detecting unit with a reference speed, and outputs a magnetizing control signal based on the result of the comparison; a switching unit switched by the magnetizing control signal, that conducts a magnetizing current of one cycle for a constant time; and a magnetizing coil that generates flux by the magnetizing current of one cycle and magnetizes the permanent magnet body.

To achieve these and other advantages and in accordance with the purpose of the present invention, as embodied and broadly described herein, there is also provided a magnetizing method for a magnetizing motor having a permanent magnet body covering an outer circumferential surface of a rotor body, the method including detecting a speed of the rotor; comparing the detected speed with a reference speed; and when the detected speed is consistent with the reference speed, applying a magnetizing current of several cycles to a magnetizing coil for a constant time, thereby magnetizing the permanent magnet body.

According to another aspect of the present invention, there is provided a magnetizing method for a magnetizing motor having a permanent magnet body covering an outer circumferential surface of a rotor body, the method including detecting a speed of the rotor; comparing the detected speed with a reference speed; and when the detected speed is consistent with the reference speed, discontinuously applying a magnetizing current of one cycle to a magnetizing coil for a constant time with a constant interval, thereby magnetizing the permanent magnet body.

The foregoing and other objects, features, aspects and advantages of the present invention will become more apparent from the following detailed description of the present invention when taken in conjunction with the accompanying drawings.

BRIEF DESCRIPTION OF THE DRAWINGS

The above, and other objects, features, and advantages of the present invention will be made apparent form the following description of the preferred embodiments, given as non-limiting examples, with reference to the accompanying drawings in which.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Hereinafter, a magnetizing motor of the present invention capable of improving magnetizing efficiency of a permanent magnet by discontinuously applying an alternating current to a magnetizing coil that magnetizes the permanent magnet for a constant time, and a magnetizing method thereof will be explained.

In the present invention, power is applied to a main winding and a supplementary winding of a stator, thus to rotate a rotor including a permanent magnet body. Then, a magnetizing coil is magnetized by an external controlling circuit at a speed greater than a reference speed corresponding to 75%-80% of a synchronous speed, thereby magnetizing the permanent magnet body.

Figure 3:
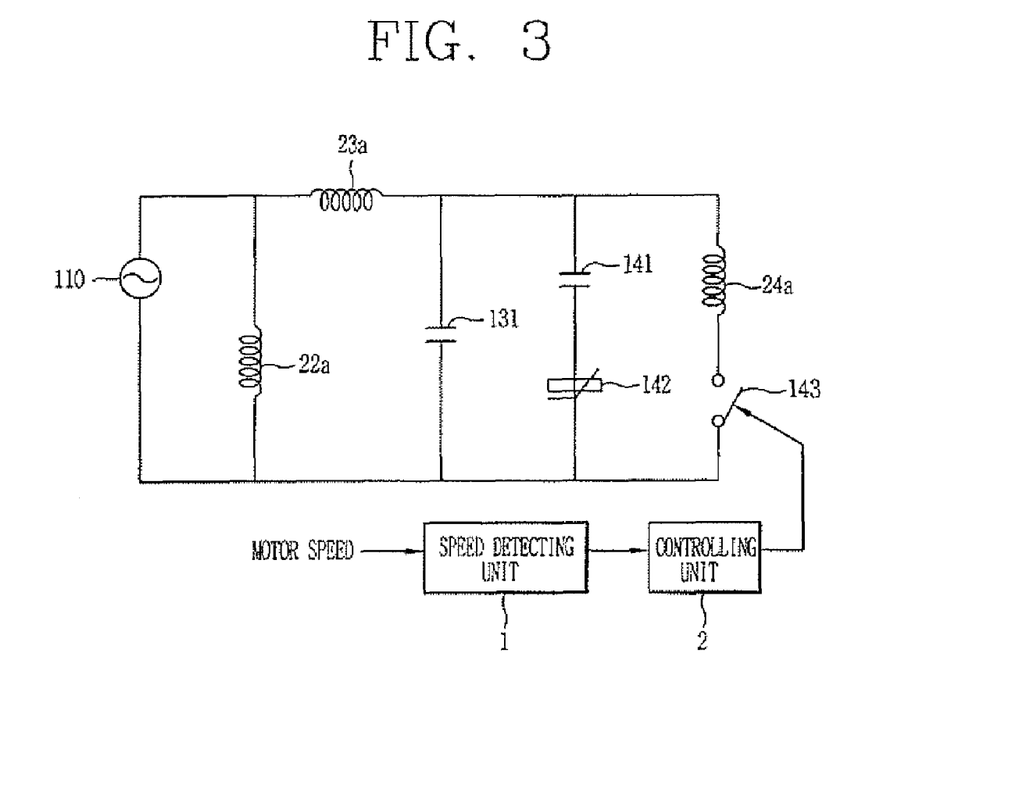
FIG. 3 is a circuit diagram showing a magnetizing motor according to the present invention.

FIG. 3 is a circuit diagram showing a magnetizing motor according to the present invention.

As shown in FIG. 3, the magnetizing motor of the present invention includes a speed detecting unit 1, a controlling unit 2, a magnetizing coil 24a, a magnetizing switch 143, and a storing unit (not shown). In addition, as shown, a main induction coil 22a, a sub induction coil 23a, and the magnetizing coil 24a are connected to a power supply 110 for supplying alternating current in parallel. A first capacitor 131 for controlling phase difference of a current applied to the sub induction coil 23a is connected to the sub induction coil 23a in accordance with a current applied to the main induction coil 22a. A second capacitor 141 for controlling a phase difference of a current applied to the magnetizing coil 24a is connected to the magnetizing coil 24a in accordance with a current applied to the main induction coil 22a.

The magnetizing coil 24a generates flux by a magnetizing current, thus to magnetize a permanent magnet body (not shown).

The magnetizing switch 143 is switched by a magnetizing control signal to conduct a magnetizing current.

The speed detecting unit 1 detects an rpm of the magnetizing motor

The storing unit (not shown) stores a reference speed for generating a magnetizing current, The controlling unit 2 compares the speed detected by the speed detecting unit 1 with a reference speed, and outputs a magnetizing control signal that controls the magnetizing switch 143 based on the result of the comparison.

Figure 4:
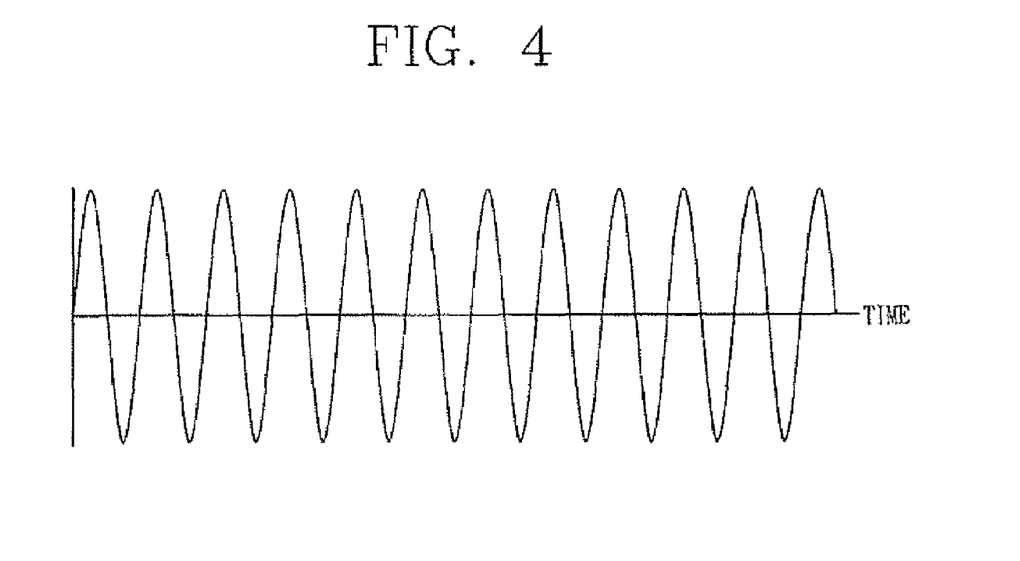
FIG. 4 is a waveform showing a current applied to a magnetizing coil of FIG. 3 according to a first embodiment of the present invention.

As shown in FIG. 4, when the detected speed is consistent with the reference speed, the controlling unit 2 applies a magnetizing control signal to the magnetizing switch 143 so that a magnetizing current of several cycles can be applied to the magnetizing coil 24a for a constant time.

When the permanent magnet body is magnetized accordingly as the magnetizing current of several cycles is applied to the magnetizing coil 24a for a constant time, the rpm of the rotor is changed, thus to cause a speed dip that lowers the magnetizing efficiency of the permanent magnet body.

Figure 5:
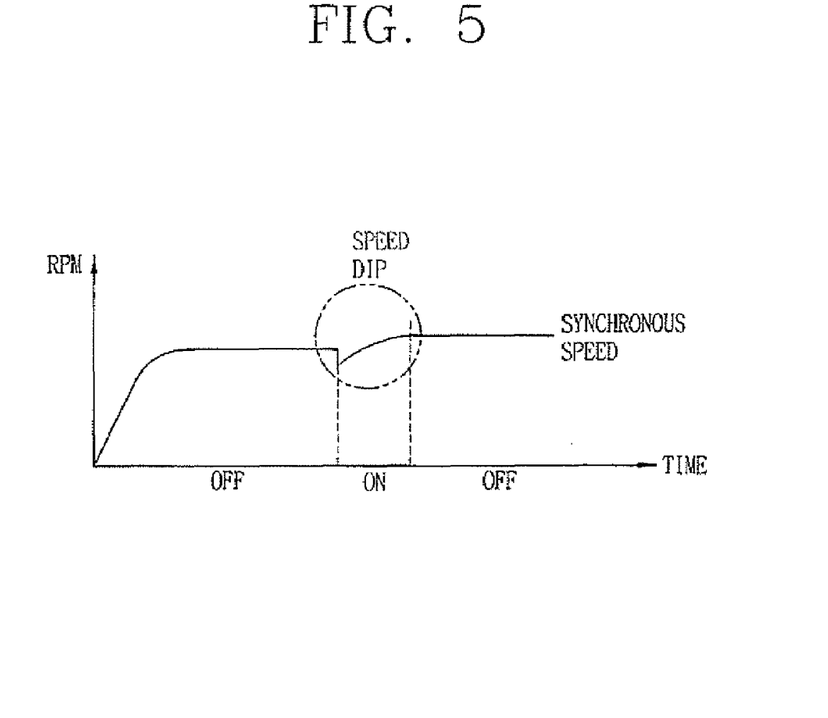
FIG. 5 is a waveform showing an rpm of the magnetizing motor of FIG. 4 according to time.

FIG. 5 is a waveform showing an rpm of the magnetizing motor according to time.

When the magnetizing coil 24a is magnetized, a magnetizing pole becomes an electromagnet. Between the electromagnet and an iron core of the rotor, an attraction force is generated, thus to instantaneously cause a speed dip.

The speed dip causes the rpm of the rotor to be changed, and induces an eddy current to a secondary squirrel cage bar (not shown). Accordingly, the magnetizing efficiency of the permanent magnet body is decreased by a reaction field.

In a motor of large capacity, the speed dip is not generated due to an inertia of the rotor. However, in a motor of small or middle capacity, the speed dip is generated due to an attraction force between the magnetizing pole and the iron core of the rotor, resulting from a small inertia of the rotor.

Figure 6:
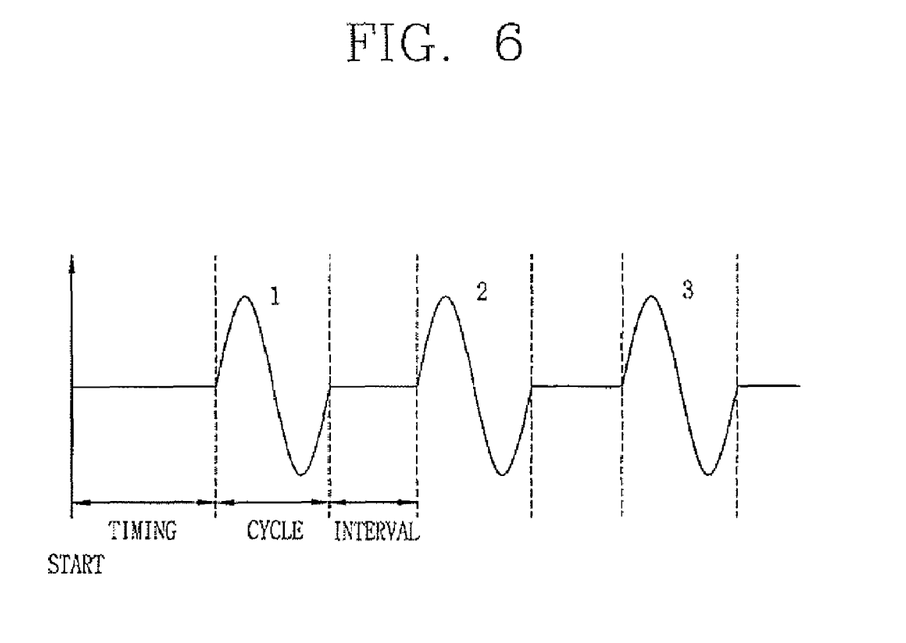
FIG. 6 is a waveform showing a current applied to a magnetizing coil of FIG. 3 according to a second embodiment of the present invention.

As shown in FIG. 6, in order to decrease the speed dip, when the rpm of the magnetizing motor is consistent with the reference speed, the controlling unit 2 outputs a magnetizing control signal so that a magnetizing current of one cycle can be applied to the magnetizing coil 24a with a constant interval.

Figure 7:
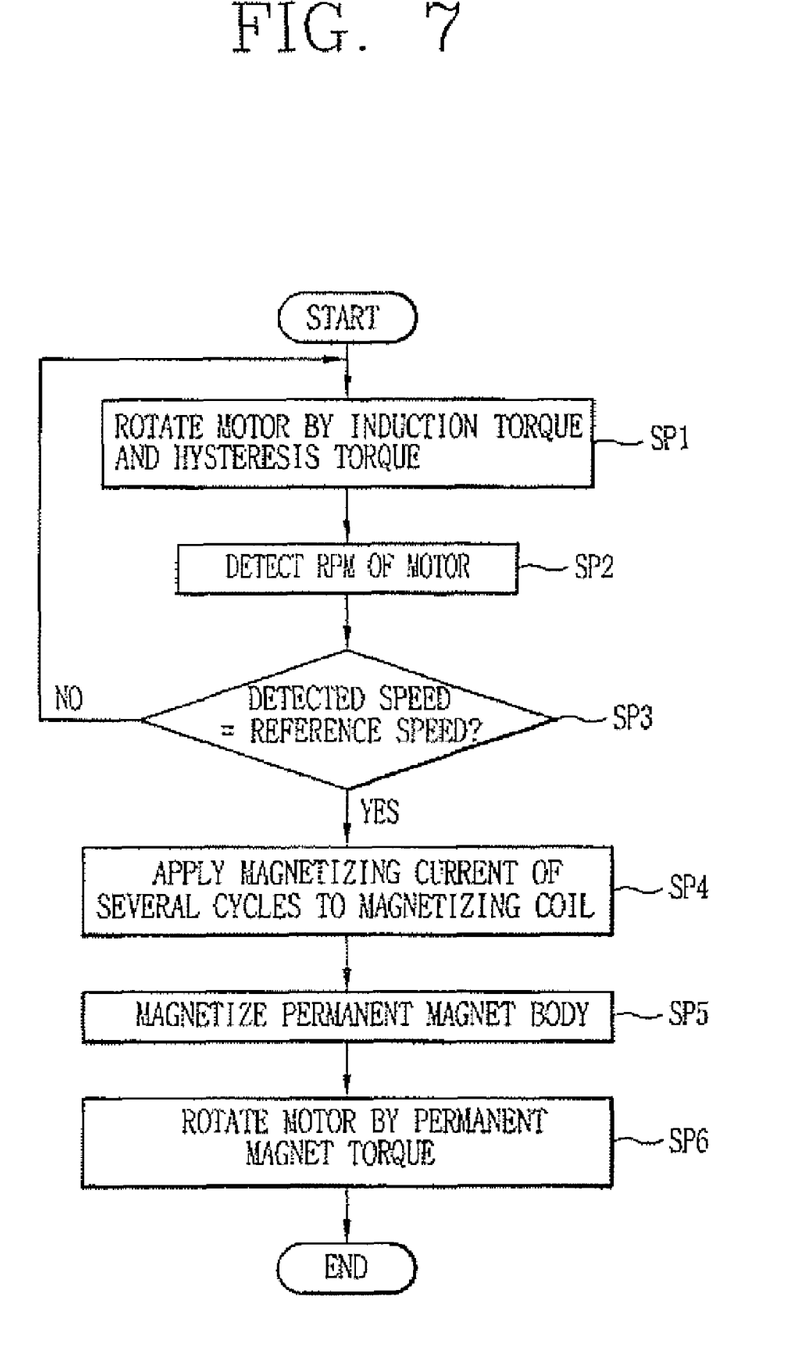
FIG. 7 is a flowchart showing a magnetizing method for a magnetizing motor according to the first embodiment of the present invention.

The operation of the magnetizing motor of the present invention will be explained with reference to FIG. 7.

At the time of initial driving, the rotor body and a bar conductor receive a hysteresis torque H and an induction torque I, respectively, and the magnetizing motor is rotated by an integration torque between the hysteresis torque H and the induction torque I.

Then, the speed detecting unit 2 detects the speed of the magnetizing motor, and applies the detected speed to the controlling unit 2 (SP2).

The reference speed is preset as a speed corresponding to 75%-80% of a synchronous speed. Thus, the reference speed may be an appropriate value, and in the present embodiment is approximately 3600 rpm.

The controlling unit 2 compares the detected speed with the reference speed (SP3), and outputs a magnetizing control signal for controlling the magnetizing switch 143 based on the result of the comparison.

When the detected rpm of the magnetizing motor is consistent with the reference speed, the controlling unit 2 applies a magnetizing control signal to the magnetizing switch 143 so that a magnetizing current of several cycles can be applied to the magnetizing coil 24a for a constant time.

The magnetizing switch 143 is conducted for a constant time thus to apply a current of several cycles to the magnetizing coil 24a (SP4) Then, flux generated from the magnetizing coil 24a is transmitted to the permanent magnet body covering an outer circumferential surface of the rotor body through an end of a magnetizing pole, thereby magnetizing the permanent magnet body (SP5).

Since the permanent magnet body becomes a permanent magnet, the magnetizing motor is rotated at a synchronous speed along a rotation magnetic field generated at the stator (SP6).

As shown in FIG. 5, the rpm of the rotor is changed, thus to cause a speed dip that lowers the magnetizing efficiency of the permanent magnet body.

Figure 8:
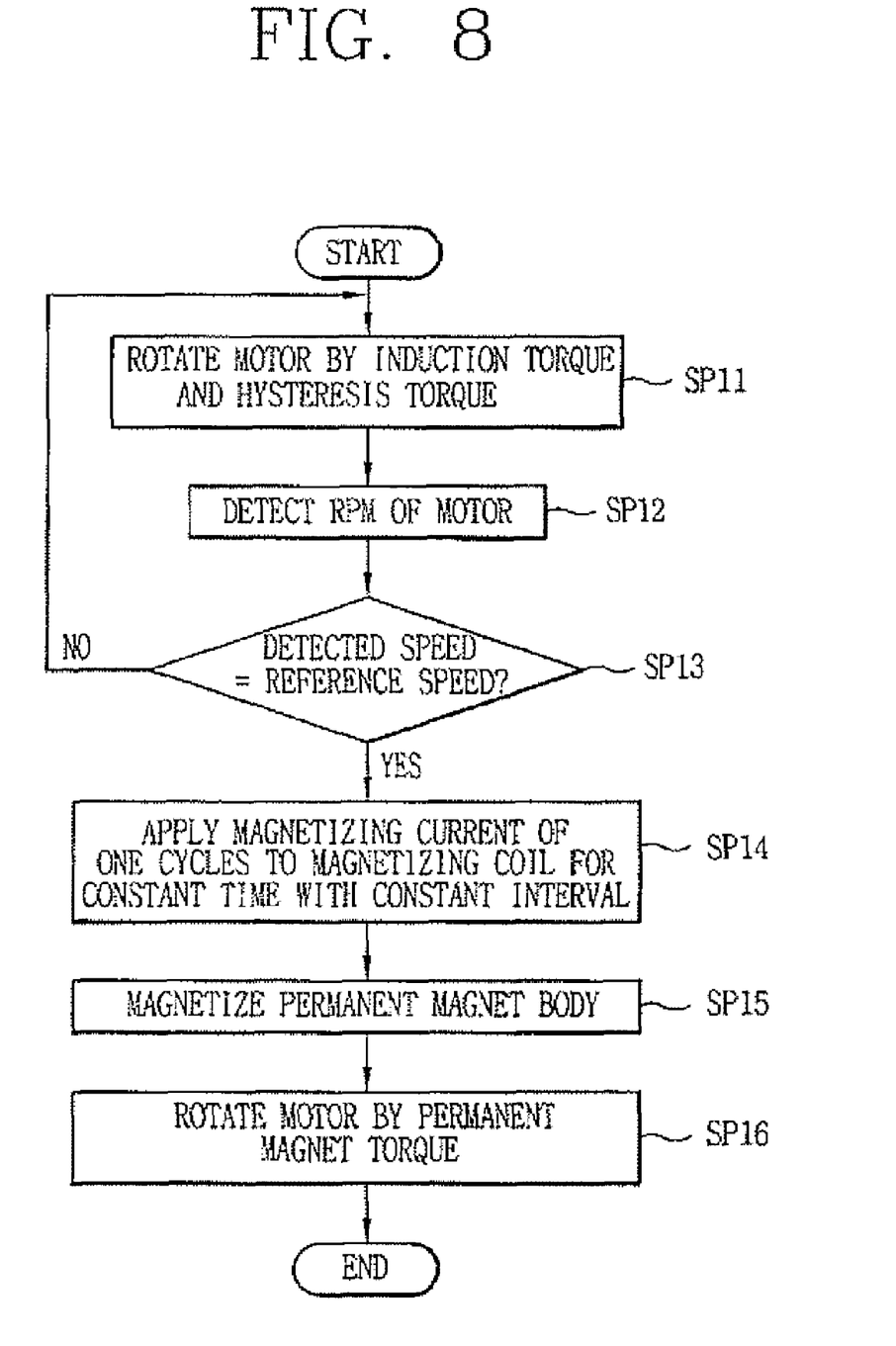
FIG. 8 is a flowchart showing a magnetizing method for a magnetizing motor according to the second embodiment of the present invention.

The magnetizing motor according to the second embodiment of the present invention will be explained with reference to FIG. 8.

At the time of initial driving, the rotor body and a bar conductor receive a hysteresis torque H and an induction torque I, respectively, and the magnetizing motor is rotated by an integration torque between the hysteresis torque H and the induction torque I (SP11).

Then, the speed detecting unit 2 detects the speed of the magnetizing motor, and applies the detected speed to the controlling unit 2 (SP12).

The reference speed is preset as a speed corresponding to 75%-80% of a synchronous speed. Thus, the reference speed may be an appropriate value, and in the present embodiment is approximately 3600 rpm.

The controlling unit 2 compares the detected speed with the reference speed (SP13), and outputs a magnetizing control signal for controlling the magnetizing switch 143 based on the result of the comparison (SP14).

When the detected rpm of the magnetizing motor is consistent with the reference speed, the controlling unit 2 applies a magnetizing control signal to the magnetizing switch 143 so that a magnetizing current of one cycle can be applied to the magnetizing coil 24a with a constant interval.

The magnetizing switch 143 is turned on and off with a constant interval, thus to apply a current to the magnetizing coil 24a. Then, flux generated from the magnetizing coil 24a is transmitted to the permanent magnet body covering an outer circumferential surface of the rotor body through an end of a magnetizing pole, thereby magnetizing the permanent magnet body (SP15).

Since the permanent magnet body is magnetized to become a permanent magnet, the magnetizing motor is rotated at a synchronous speed along a rotational magnetic field generated at the stator (SP16).

Figure 9:
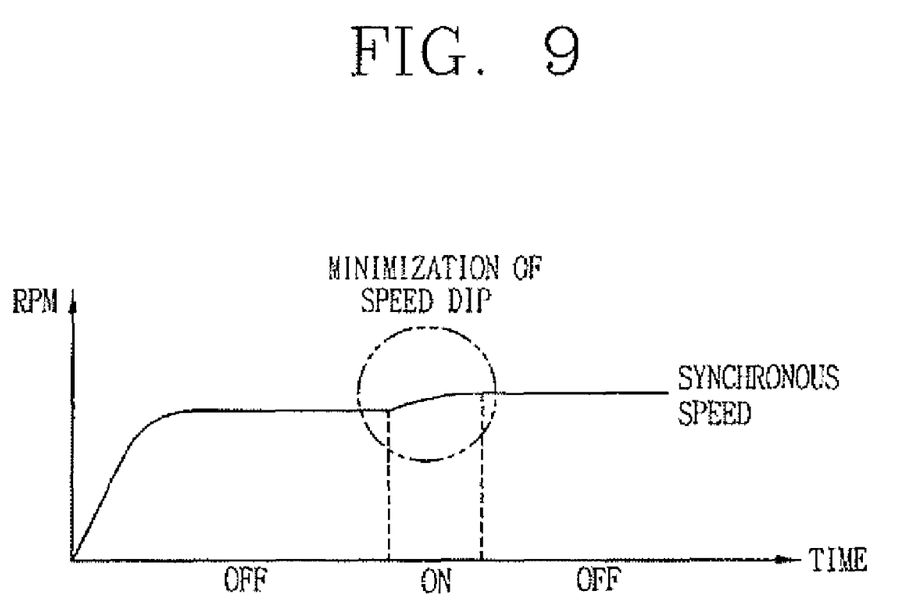
FIG. 9 is a waveform showing an rpm of the magnetizing motor of FIG. 8 according to time.

FIG. 9 is a waveform showing an rpm of the magnetizing motor according to time, in which a speed dip is minimized.

In the magnetizing motor according to the present invention, a current is applied to the permanent magnet body for a constant time through the magnetizing coil only when the permanent magnet body is magnetized. Accordingly, a heat loss generated from the magnetizing coil is reduced thus to enhance the motor efficiency.

Furthermore, in the magnetizing motor according to the present invention, a current is discontinuously applied to the permanent magnet body for a constant time through the magnetizing coil only when the permanent magnet body is magnetized. Accordingly, change of the rpm of the rotor is prevented, and thus magnetizing efficiency of the permanent magnet body is improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

Although the embodiments of the present invention have been described herein with reference to the accompanying drawings, many modifications and changes may be made by those skilled in the art without departing from the scope of the invention.

It is further noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials, and embodiments, the present invention is not intended to be limited to the particulars disclosed herein; rather the present invention extends to all functionally equivalent structure, methods, and uses, such as are within the scope of the appended claims.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Although the invention has been described with reference to several exemplary embodiments, it is understood that the words that have been used are words of description and illustration, rather than words of limitation. As the present invention may be embodied in several forms without departing from the spirit or essential characteristics thereof, it should also be understood that the above described embodiments are not limited by any of the details of the foregoing description, unless other specified. Rather, the above described embodiments should be construed broadly within the spirit and scope of the present invention as defined in the appended claims. Therefore, changes may be made within the metes and bounds of the appended claims, as presently stated and as amended, without departing from the scope and spirit of the invention in its aspects.

What is claimed is:

1. A magnetizing motor having a permanent magnet body covering an outer circumferential surface of a rotor body, said magnetizing motor comprising:
    a speed detecting unit that detects a speed of the magnetizing motor; and
    a controlling unit that compares the speed detected by the speed detecting unit with a reference speed, and outputs a magnetizing control signal based on the result of the comparison;
    wherein when the detected speed is consistent with the reference speed, the controlling unit outputs a magnetizing control signal to generate a magnetizing current of several cycles for a constant time.

2. The magnetizing motor of claim 1, wherein when the detected speed is consistent with the reference speed, the controlling unit outputs a magnetizing control signal to generate a magnetizing current of one cycle with a constant interval.

3. The magnetizing motor of claim 1, further comprising a storing unit that stores a reference speed to generate a magnetizing current.

4. The magnetizing motor of claim 1, wherein the reference speed corresponds to 75%-80% of a synchronous speed.

5. The magnetizing motor of claim 1, further comprising:
    a switching unit switched by the magnetizing control signal, that conducts a magnetizing current of several cycles for a constant time; and
    a magnetizing coil that generates flux by the magnetizing current of several cycles and thus magnetizes the permanent magnet body.

6. The magnetizing motor of claim 1, further comprising:
    a switching unit switched by the magnetizing control signal, that conducts a magnetizing current of one cycle for a constant time with a constant interval; and
    a magnetizing coil that generates flux by the magnetizing current of one cycle and thus magnetizes the permanent magnet body.

7. A magnetizing motor having a permanent magnet body covering an outer circumferential surface of a rotor body, said magnetizing motor comprising:
    a speed detecting unit that detects a speed of the magnetizing motor;
    a controlling unit that compares the speed detected by the speed detecting unit with a reference speed, and outputs a magnetizing control signal based on the result of the comparison;
    a switching unit switched by the magnetizing control signal, that conducts a magnetizing current of several cycles for a constant time; and
    a magnetizing coil that generates flux by the magnetizing current of several cycles and magnetizes the permanent magnet body.

8. The magnetizing motor of claim 7, wherein when the detected speed is consistent with the reference speed, the controlling unit outputs a magnetizing control signal to generate a magnetizing current of several cycles for a constant time.

9. The magnetizing motor of claim 7, further comprising a storing unit that stores a reference speed to generate a magnetizing current.

10. The magnetizing motor of claim 7, wherein the reference speed corresponds to 75%-80% of a synchronous speed.

11. A magnetizing motor having a permanent magnet body covering an outer circumferential surface of a rotor body, the magnetizing motor comprising:
- a speed detecting unit that detects a speed of the magnetizing motor;
- a controlling unit that compares a speed detected by the speed detecting unit with a reference speed, and outputs a magnetizing control signal based on the result of the comparison;
- a switching unit switched by the magnetizing control signal, that conducts a magnetizing current of one cycle for a constant time with a constant interval; and
- a magnetizing coil that generates flux by the magnetizing current of one cycle and thus magnetizes the permanent magnet body.

12. The magnetizing motor of claim 11, wherein when the detected speed is consistent with the reference speed, the controlling unit outputs a magnetizing control signal to generate a magnetizing current of one cycle for a constant time with a constant interval.

13. The magnetizing motor of claim 11, further comprising a storing unit that stores a reference speed to generate a magnetizing current.

14. The magnetizing motor of claim 11, wherein the reference speed corresponds to 75%-80% of a synchronous speed.

15. A magnetizing method for a magnetizing motor having a permanent magnet body covering an outer circumferential surface of a rotor body, the method comprising:
- detecting a speed of the rotor;
- comparing the detected speed with a reference speed; and
- when the detected speed is consistent with the reference speed, applying a magnetizing current of several cycles to a magnetizing coil for a constant time, thereby magnetizing the permanent magnet body.

16. The method of claim 15, further comprising storing a reference speed preset to generate a magnetizing current.

17. The method of claim 15, wherein the reference speed corresponds to 75%-80% of a synchronous speed.

18. A magnetizing method for a magnetizing motor having a permanent magnet body covering an outer circumferential surface of a rotor body, the method comprising:
- detecting a speed of the rotor;
- comparing the detected speed with a reference speed; and
- when the detected speed is consistent with the reference speed, applying a magnetizing current of one cycle to a magnetizing coil for a constant time with a constant interval, thereby magnetizing the permanent magnet body.

19. The method of claim 18, further comprising storing a reference speed preset to generate a magnetizing current.

20. The method of claim 18, wherein the reference speed corresponds to 75%-80% of a synchronous speed.

* * * * *